United States Patent Office 2,748,096
Patented May 29, 1956

2,748,096

RUBBERS STABILIZED BY A BIS(2-HYDROXY-3-α-ALKYL - CYCLOALKYL - 5 - METHYLPHENYL)-METHENE OR SALTS THEREOF

Arthur Lambert and Boris Nicholas Leyland, Blackley, Manchester, England, assignors to Imperial Chemical Industries Limited, a corporation of Great Britain No Drawing. Application December 8, 1952, Serial No. 324,822

Claims priority, application Great Britain December 19, 1951

6 Claims. (Cl. 260—29.7)

This invention relates to improvements in the manufacture of age-resistant natural and synthetic rubbers and rubber articles.

We have found that bis-(2-hydroxy-3-α-alkylcycloalkyl-5-methylphenyl)-methanes, in which the cycloalkyl group is a cyclopentyl, methylcyclopentyl, cyclohexyl or methylcyclohexyl one and the alkyl substituent has not more than 4 carbon atoms and is attached to the α-carbon atom of the cycloalkyl group, i. e. the carbon atom which is joined to the phenyl radical are very valuable antioxidants for natural and synthetic rubbers.

The above mentioned compounds are new and they are made according to the processes which are described in co-pending application No. 324,821, filed December 8, 1952.

The new compounds are, according to one process of the invention, manufactured in two stages. The first stage consists of combining, in the presence of an acid condensing agent, 1 molecular proportion of p-cresol with 1 molecular proportion of an alpha-alkylcyclopentene, methyl-alpha-alkylcyclopentene, alpha-alkylcyclohexene or methyl-alpha-alkylcyclohexene, in which the alkyl substituent has not more than 4 carbon atoms. In the second stage, 2 molecular proportions of the p-cresol derivative, i. e. 2-alpha-alkyl-cycloalkyl-4-methylphenol, which is obtained in the first stage, are condensed with one molecular proportion of formaldehyde or of a substance yielding formaldehyde, in the presence of an acid condensing agent.

We have also found that the normal and basic aluminium, barium, calcium, magnesium, strontium, and zinc salts of the above new compounds are likewise valuable antioxidants for natural and synthetic rubbers.

These salts, which are themselves new, may be made from the above new compounds according to known methods of salt formation.

Both the new compounds and their salts have not only excellent preservative properties in rubbers and produce little or no staining but they have excellent physical properties also which make them well adapted for use in the mechanical processes employed in manufacturing rubber articles. They are also well adapted for addition to latices of both natural and synthetic rubber and for stabilising the latter.

The antioxidants are employed in the manufacture of rubber and rubber articles according to the usual methods. Thus they may for example be mixed with the rubber along with vulcanising and other ingredients and the resulting mixes then cured by heat treatment, or they may be mixed with rubber along with other compounding ingredients and the mixture vulcanized by treatment with sulphur monochloride in the cold. The antioxidants are effective in proportions of from about ¼ to 2 per cent of the weight of the rubber.

The synthetic rubbers which may be used include for example polymers of butadiene-1:3, isobutene and 2-chloro-butadiene-1:3 and copolymers of either of these compounds with acrylonitrile, styrene, methyl methacrylate and other well known polymerisable compounds which are used in the manufacture of these rubbers.

The following examples in which parts are by weight illustrate but do not limit the invention.

Example 1

Vulcanisable rubber stocks of the following compositions were prepared by the usual process of mixing using bis - (2 - hydroxy - 3 - α - methylcyclohexyl - 5 - methylphenyl)-methane as antioxidant and using also no antioxidant.

The above antioxidant may be made according to the process of co-pending application No. 324,821, filed December 8, 1952.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Sulphur | 3 | 3 |
| Diphenylguanidine | 0.5 | 0.5 |
| Antioxidant | | 1 |

Sheets of each mix were cured for 75 minutes at 141° C. and ageing tests carried out on the vulcanisates.

The results of the ageing tests were as follows:

| | A | B |
|---|---|---|
| Unaged tensile strength (Kg./cm.²) | 196 | 191 |
| Percent retained tensile strength after bomb ageing at 70° C. and 300 p.s.i. oxygen pressure: | | |
| 8 days | Perished | 51 |
| 12 days | do | 38 |
| 16 days | do | 34 |

Example 2

Vulcanisable rubber stocks of the following compositions were prepared by the usual process of mixing using bis - (2 - hydroxy - 3 - α - methylcyclohexy - 5 - methylphenyl)-methane as antioxidant and using also no antioxidant.

| Mix | C | D |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| Antioxidant | | 1 |

Sheets of each mix were cured for 12 minutes at 125° C. and ageing tests carried out on the vulcanisates. Staining was also examined by exposure outdoors.

The results of the ageing tests were as follows:

| Mix | C | D |
|---|---|---|
| Unaged tensile strength (Kg./sq. cm.) | 172 | 170 |
| Percent retained tensile strength after bomb ageing at 70° C. and 300 p. s. i. oxygen pressure: | | |
| for 12 days | Perished | 77 |
| for 16 days | do | 78 |

The results of the staining tests were as follows:

| Mix | C | D |
|---|---|---|
| Colour after 13 weeks' exposure outdoors | Pale cream | Cream |

Example 3

This is similar to Example 2, as regards the mixes (except the antioxidants), the curing and the testing, but includes 4 separate sets of tests, each set having been performed separately. In each set there is one or more mixes with antioxidants and one without as shown in the following lists:

E. No antioxidant.
F. Bis - (2 - hydroxy - 3 - α - ethylcyclohexyl - 5 - methylphenyl) - methane.
G. Bis - (2 - hydroxy - 3 - αγ - dimethylcyclohexyl - 5 - methylphenyl) - methane.

H. No antioxidant.
I. Bis - (2 - hydroxy - 3 - α - n - butylcyclohexyl - 5 - methylphenyl) - methane.

J. No antioxidant.
K. Bis - (2 - hydroxy - 3 - αγ - dimethylcyclohexyl - 5 - methylphenyl) - methane.

L. No antioxidant.
M. Magnesium salt of bis-(2-hydroxy-3-α-methylcyclohexyl-5-methylphenyl)-methane.

|  | E | F | G | H | I | J | K | L | M |
|---|---|---|---|---|---|---|---|---|---|
| Tensile strength (Kg./sq. cm.): |  |  |  |  |  |  |  |  |  |
| Unaged | 185 | 186 | 179 | 187 | 178 | 226 | 198 | 189 | 185 |
| After bomb ageing 70° C.—8 days | pr | 85 | 88 |  |  | pr | 80 | pr | 91 |
| At 70° C., 300 p. s. i.—12 days | pr | 79 | 77 | p | 74 |  |  | pr | 78 |
| In oxygen—16 days | pr | 54 | 68 |  |  | pr | 62 | pr | 68 |
| After Geer oven—2 weeks | 66 | 83 | 85 |  |  | 58 | 74 |  |  |
| Ageing—4 weeks | 44 | 75 | 83 |  |  | 41 | 66 |  |  |
| At 70° C.—6 weeks |  |  |  |  |  | 29 | 44 |  |  |
| After Geer oven—16 hours | 46 | 60 | 67 |  |  | 36 | 52 |  |  |
| Ageing—32 hours | 33 | 52 | 55 | 39 | 57 |  |  |  |  |
| At 100° C.—48 hours | 23 | 38 | 39 |  |  | 22 | 37 | 36 | 50 |
| Shade after outdoor exposure | pc | c | c | vpc | vpc | vpc | pc | vpc | pc |

In the table the following abbreviations are used, viz: pr=perished, p=pale, c=cream, and v=very.

Mixes E, F and G were exposed for 13 weeks, H, I, L and M for 4 weeks and J and K for 8 weeks.

What we claim is:
1. A composition comprising a rubbery polymer selected from the group consisting of natural rubber, butadiene synthetic rubber, and chlorobutadiene synthetic rubber having incorporated therein at least one cycloalkyl compound selected from the group consisting of bis-(2-hydroxy - 3 - alpha - alkyl - cycloalkyl - 5 - methylphenyl)-methanes and the basic and normal aluminum, barium, calcium, magnesium, strontium and zinc salts of such methanes, the cycloalkyl group in the latter being selected from the group consisting of cyclopentyl, methylcyclopentyl, cyclohexyl and methylcyclohexyl and the alkyl substituent has not more than four carbon atoms and is attached to the alpha-carbon atom of the cycloalkyl group, which is the carbon atom joined to the phenyl radical.

2. The composition of claim 1 wherein said cycloalkyl compound is bis-(2-hydroxy-3-alpha-methylcyclohexyl-5-methylphenyl)-methane.

3. The composition of claim 1 wherein said cycloalkyl compound is bis-(2-hydroxy-3-alpha-gamma-dimethylcyclohexyl-5-methylphenyl)-methane.

4. The composition of claim 1 wherein said cycloalkyl compound is bis-(2-hydroxy-3-alpha-n-butylcyclohexyl-5-methyl-phenyl)-methane.

5. The composition of claim 1 wherein said cycloalkyl compounds is the magnesium salt of bis-(2-hydroxy-3-adpha-methyl-cyclohexyl-5-methylphenyl)-methane.

6. The composition of claim 1 wherein the rubbery polymer is in the form of a stabilized synthetic rubber latex.

References Cited in the file of this patent

UNITED STATES PATENTS

| 2,162,172 | Honel et al. | June 19, 1939 |
| 2,295,985 | Baird et al. | Sept. 15, 1942 |
| 2,430,002 | De Groote et al. | Nov. 4, 1947 |
| 2,628,953 | Newby | Feb. 17, 1953 |